UNITED STATES PATENT OFFICE.

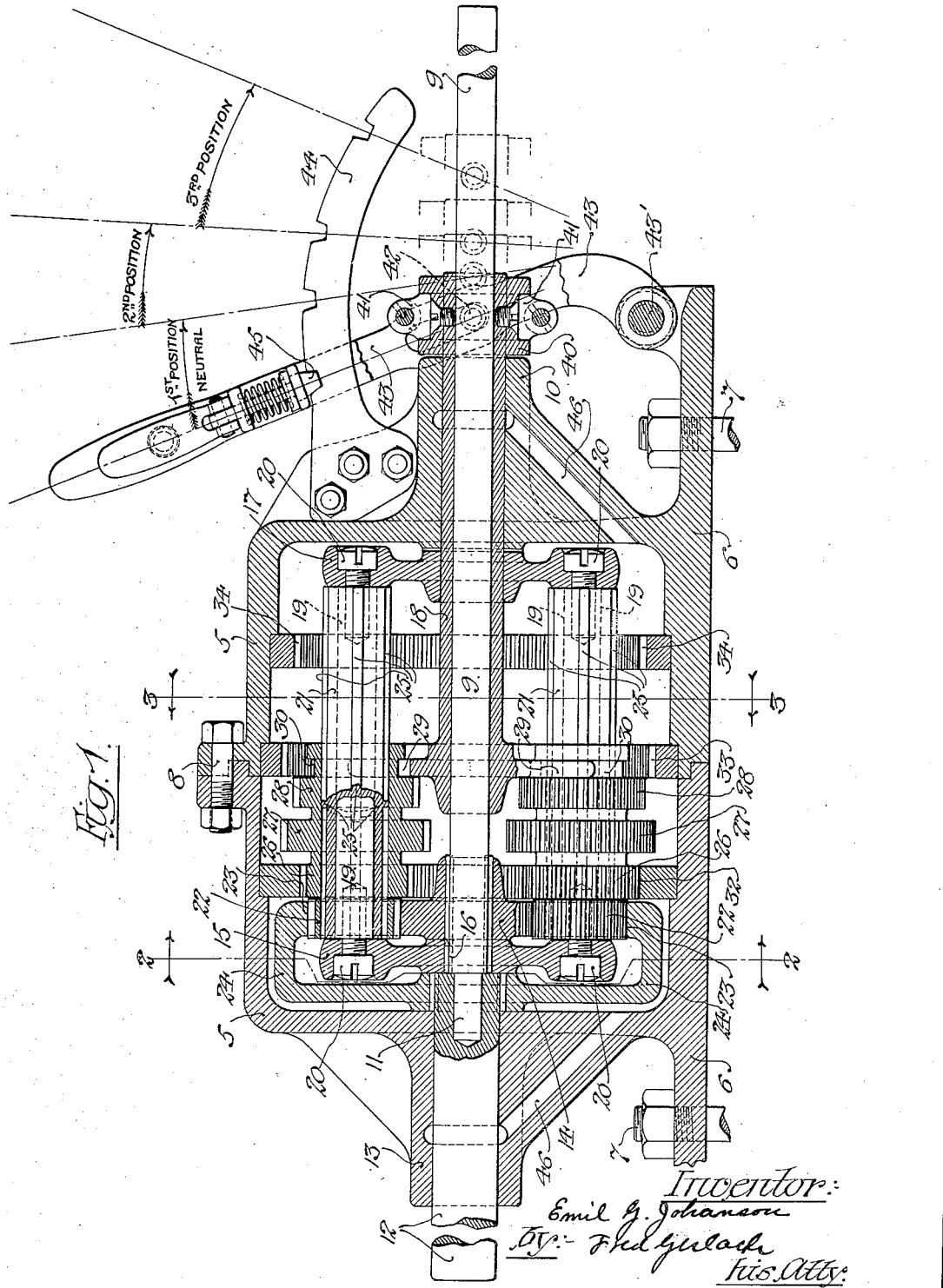

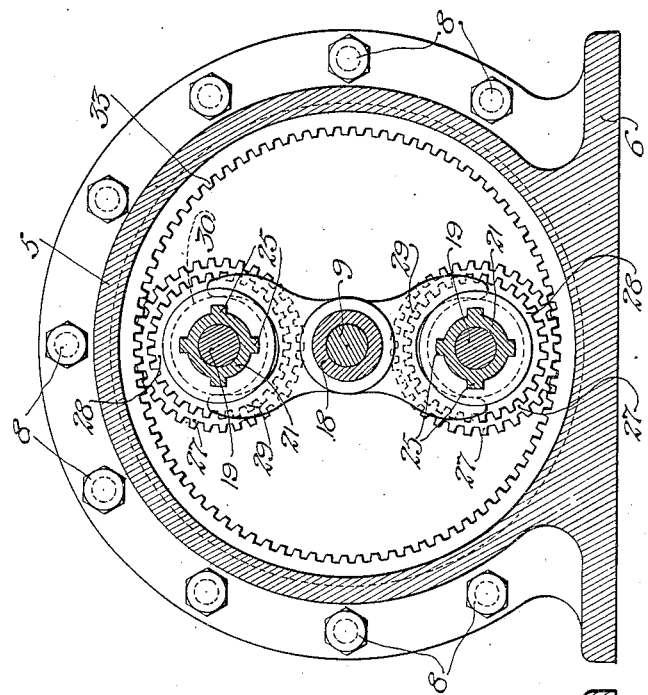
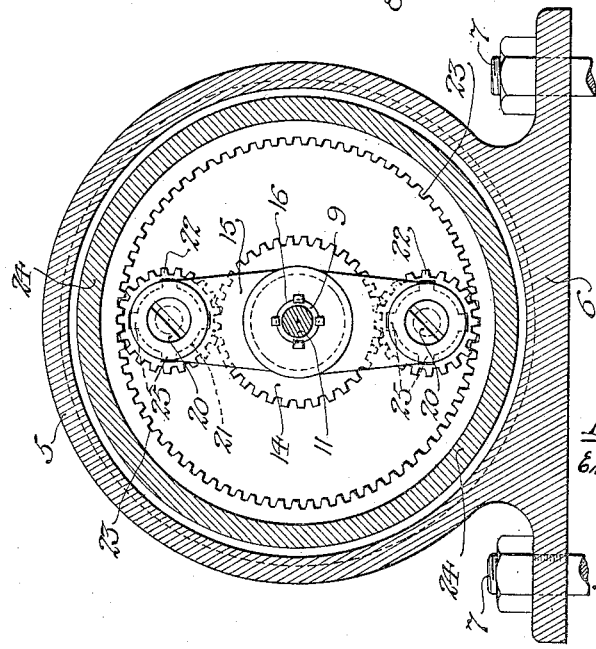

EMIL G. JOHANSON, OF ROCKFORD, ILLINOIS.

REDUCING GEARING.

1,427,599.  Specification of Letters Patent.  Patented Aug. 29, 1922.

Application filed April 17, 1922. Serial No. 553,699.

*To all whom it may concern:*

Be it known that I, EMIL G. JOHANSON, a subject of the King of Sweden, and a resident of Rockford, in the county of Winnebago and State of Illinois, have invented certain new and useful Improvements in Reducing Gearing, of which the following is a full, clear and exact description.

The invention relates to reducing gearing and its object is to provide mechanism which is adapted for reductions to different speeds, is simple in construction and efficient in operation.

The invention consists in the several novel features hereinafter set forth and more particularly defined by claims at the conclusion hereof.

In the drawings: Fig. 1 is a longitudinal section of gearing embodying the invention, parts being shown in elevation. Fig. 2 is a section on line 2—2 of Fig. 1. Fig. 3 is a section on line 3—3 of Fig. 1.

The invention is exemplified in mechanism comprising a stationary case 5 which is provided with an integral base 6 by which it is secured to a floor or other part by bolts 7 and is formed of separable sections secured together by bolts 8. This case is adapted to retain lubricant and completely enclose the gearing. A high-speed shaft 9 extends through one side of the case and is supported in a bearing 10 formed thereon. The inner end 11 of shaft 9 is extended into the coaxial low speed shaft 12, which is journalled in a bearing 13 formed on the other side of the case and through which the latter shaft extends for connection to the mechanism to be driven at low speed. A drive pinion 14, fixed to rotate with and driven by the high speed shaft 9, is disposed near the inner end thereof.

The present invention relates to that type of reducing gearing in which planetary pinions meshing with stationary internal gears are adapted to drive a rotatable gear connected to the low speed shaft, the pinions being of different sizes to vary the planetary travel thereof and correspondingly vary the speed of the driven shaft. A carrier for the planetary pinions is rotatable around the driven shaft and comprises a frame 15 which is rotatably mounted on portion 16 of shaft 9, a frame 17 which is mounted on a sleeve 18 around said shaft, and a series of longitudinal rods 19 which are rigidly secured to frames 15 and 17 by countersunk nuts 20 to rigidly tie all portions of the carrier together. Rods 19 are oppositely disposed, so that they will balance one another. A sleeve 21 is rotatably held on two of the opposite rods 9 and extends between the frames 15 and 17. Adjacent frame 15, each sleeve 21 is provided with a pinion 22 rigid thereon, the inner portion of which meshes with pinion 14 on high-speed shaft 9 and the outer portion of which constantly meshes with an internal gear 23 on a wheel 24 which is fixed to the inner end of the low speed shaft 12. Each sleeve 21 is provided with longitudinal keys 25 to drive a set of pinions 26, 27 and 28 which are integrally formed and are slidable longitudinally on a sleeve 21. Sleeve 18 extends through bearing 10 in one side of the case 5 and is provided with a pair of oppositely extending forked arms 29 which fit into grooves 30 in a hub at one side of pinions 28. Sleeve 18 is slidable longitudinally through bearing 10 and on shaft 9 to longitudinally shift the planetary pinions 26, 27 and 28 on sleeves 21. Pinions 26 are adapted to mesh with a stationary internal gear 32; pinions 27 are adapted to mesh with a stationary internal gear 33; and pinions 28 are adapted to mesh with a stationary internal gear 34. Pinions 26, 27 and 28 are of different diameters and the stationary gears 32, 33, and 34 are correspondingly different in diameter, so that the planetary travel and the speed of rotation of pinions 22 around their own axes may be varied to drive the wheel 24 and shaft 12 at different speeds. A grooved collar 40 is secured to the outer end of sleeve 18 and a stationary ring 41 fits into said collar and is provided with trunnions 42 which are suitably connected to a lever 43 by which the sleeve 18 may be shifted longitudinally to adjust the planetary pinions into and out of their respective operative positions. Any suitable locking device, such as a segment 44 and locking pin 45, may be provided to secure the sleeve 18 against longitudinal movement. Ducts 46 are formed in the case to return oil from the outer ends of bearings 10 and 13 to the chamber in the case.

The operation will be as follows: When the sleeve 18 is set to hold pinions 26 in engagement with the stationary gear 32, the high speed shaft 9 will drive pinion 14 which will drive pinions 22. By reason of the engagement of pinions 26 with the stationary gear 32, planetary movement will be imparted to all of the pinions on sleeve 21, the speed of bodily rotation thereof being determined by the ratio between the pinions 26 and internal gear-ring 32. Pinions 22 will simultaneously rotate around their own axes in a direction reverse to the rotation of shaft 9 to further reduce the speed of wheel 24 relatively to the bodily movement of the planetary pinions. Pinions 28 are greater in diameter than pinions 26, so that when pinions 28 are shifted longitudinally to engage stationary gear-ring 34, the bodily rotation of the planetary gears will be increased relatively to that when the pinions 26 are operative and, as a result, the speed of wheel 24 and shaft 12 will be correspondingly higher. When the pinions 27 are shifted into mesh with stationary gear 33, the bodily rotation of pinions 22 will be still further increased so that wheel 24 and shaft 12 will be driven at a correspondingly higher speed.

The invention exemplifies a variable speed reducing gear in which wide variations in reduction may be attained with comparatively slow variations in gear diameters, which is compact and is well balanced to minimize vibration.

The invention is not to be understood as restricted to the details set forth, since these may be varied within the scope of the appended claims, without departing from the spirit and scope of the invention.

Having thus described the invention, what I claim as new and desire to secure by Letters Patent, is:

1. In speed reducing mechanism, the combination of a stationary case, a high speed shaft extending into one side of the case, a low speed or driven shaft extending into the other side of the case, a pinion fixed to the high speed shaft, an internal gear-wheel secured to the low speed shaft, a rotatable carrier in the case, planetary longitudinally adjustable pinions on the carrier driven by the pinion on the high speed shaft, stationary internal gears for meshing with the adjustable planetary gears respectively, a driving connection between the planetary gears and the internal gear on the low speed shaft, and means for adjusting the planetary gears longitudinally to bring them into engagement with the stationary internal gears respectively.

2. In speed reducing mechanism, the combination of a stationary case, a high speed shaft extending into one side of the case, a low speed or driven shaft extending into the other side of the case, a pinion fixed to the high speed shaft, an internal gear-wheel secured to the low speed shaft, a rotatable carrier in the case, said pinion on the high speed shaft being disposed within the carrier, planetary longitudinally adjustable pinions on the carrier, driven by the pinion on the high speed shaft, stationary internal gears for meshing with the adjustable planetary gears respectively, a driving connection between the planetary gears and the internal gear on the low speed shaft, and means for adjusting the planetary gears longitudinally to bring them into engagement with the stationary internal gears respectively.

3. In speed reducing mechanism, the combination of a stationary case, a high speed shaft extending into one side of the case, a low speed or driven shaft extending into the other side of the case, a pinion fixed to the high speed shaft, an internal rotatable gear-wheel secured for driving the low speed shaft, a rotatable carrier in the case, a planetary pinion mounted on the carrier and meshing with the pinion on the high-speed shaft, longitudinally adjustable pinions on the carrier, and stationary internal gears in the case with which the adjustable pinions are adapted to mesh respectively to operate the carrier at different speeds, the carrier being connected to drive the rotatable internal gear.

4. In speed reducing mechanism, the combination of a stationary case, a high speed shaft extending into one side of the case, a low speed or driven shaft extending into the other side of the case, a pinion fixed to the high speed shaft, an internal rotatable gear-wheel secured for driving the low-speed shaft, a rotatable carrier in the case, a planetary pinion mounted on the carrier and meshing with the pinion on the high speed shaft and with the rotatable integral gear, longitudinally adjustable pinions on the carrier, and stationary internal gears in the case with which the adjustable pinions are adapted to mesh respectively to operate the carrier at different speeds.

5. In speed reducing mechanism, the combination of a stationary case, coaxial high and low speed shafts journalled in the sides respectively and extended into the case, a rotatable internal gear fixed to the low speed shaft, internal stationary gears in the case, a rotatable carrier in the case, a plurality of oppositely disposed longitudinal shafts on the carrier, longitudinally adjustable pinions on each of said shafts adapted to mesh with the stationary gears respectively and to rotate the carrier at different speeds, planetary pinions on the shafts of the carriers respectively engaging said rotatable internal gear, and means for conjointly shifting the adjustable pinions on the shafts on the carrier.

6. In speed reducing mechanism, the combination of a stationary case, coaxial high and low speed shafts journalled in the sides respectively and extended into the case, a rotatable internal gear fixed to the low-speed shaft, internal stationary gears in the case, a rotatable carrier in the case, a plurality of oppositely disposed longitudinal shafts on the carrier, a set of longitudinally adjustable pinions on each of said shafts adapted to mesh with the stationary gears respectively and to rotate the carrier at different speeds, planetary pinions on the shafts of the carriers respectively connected to drive said rotatable internal gear, a pinion on the high speed shaft engaging the latter planetary pinions, and means for conjointly shifting the adjustable pinions on the shafts.

7. In speed reducing mechanism, the combination of a stationary case, coaxial high and low speed shafts extending through the sides respectively and into the case, a rotatable internal gear fixed to the low speed shaft, internal stationary gears in the case, a rotatable carrier in the case, a plurality of oppositely disposed longitudinal shafts on the carrier, a set of longitudinally adjustable pinions on each of said shafts, adapted to mesh with the stationary gears respectively and to rotate the carrier at different speeds, planetary pinions on the shafts of the carriers respectively engaging said rotatable internal gear, a pinion on said high-speed shaft meshing with the latter planetary pinions, and means for conjointly shifting the adjustable pinions on the shafts.

8. In speed reducing mechanism, the combination of a stationary case, coaxial high and low speed shafts extending through the sides respectively and into the case, a rotatable internal gear fixed to the low speed shaft, internal stationary gears in the case, a rotatable carrier in the case, a plurality of oppositely disposed longitudinal shafts on the carrier, a set of longitudinally adjustable pinions on each of said shafts adapted to mesh with the stationary gears respectively and to rotate the carrier at different speeds, planetary pinions on the shafts of the carriers respectively engaging said rotatable internal gear, and means for conjointly shifting the adjustable pinions on the shafts comprising a sleeve around the high speed shaft, and on which one end of the carrier is rotatably mounted.

Signed at Chicago, Illinois, this 22nd day of March, 1922.

EMIL G. JOHANSON.